US008065309B1

(12) United States Patent (10) Patent No.: US 8,065,309 B1
Bar-Yossef et al. (45) Date of Patent: Nov. 22, 2011

(54) COUNTING UNIQUE SEARCH RESULTS

(75) Inventors: Ziv Bar-Yossef, Herzliya (IL); Kfir Karmon, Ramat-Gan (IL)

(73) Assignee: Google Inc., Mountain View, CA (US)

( * ) Notice: Subject to any disclaimer, the term of this patent is extended or adjusted under 35 U.S.C. 154(b) by 613 days.

(21) Appl. No.: 12/106,860

(22) Filed: Apr. 21, 2008

(51) Int. Cl.
*G06F 17/30* (2006.01)
*G06F 15/16* (2006.01)

(52) U.S. Cl. ....................... 707/747; 711/216

(58) Field of Classification Search .......... 1/1; 707/737, 707/747, 752, 728, 729, 731, 740, 999.01–999.206, 707/698; 711/216
See application file for complete search history.

(56) References Cited

U.S. PATENT DOCUMENTS

| 6,038,561 | A  | * | 3/2000  | Snyder et al. ........................ | 1/1 |
| 2003/0055813 | A1 | * | 3/2003  | Chaudhuri et al. ............... | 707/3 |
| 2004/0049492 | A1 | * | 3/2004  | Gibbons ........................... | 707/2 |
| 2005/0251510 | A1 | * | 11/2005 | Billingsley et al. ............... | 707/3 |
| 2007/0106666 | A1 | * | 5/2007  | Beckerle et al. .................. | 707/7 |
| 2007/0239663 | A1 | * | 10/2007 | Dyskant ............................ | 707/2 |
| 2007/0255702 | A1 | * | 11/2007 | Orme ................................ | 707/5 |
| 2009/0192980 | A1 | * | 7/2009  | Beyer et al. ....................... | 707/2 |

OTHER PUBLICATIONS

Noga Alon et al., "The space complexity of approximating the frequency moments," *Symposium on Theory of Computing '96*, pp. 20-29, 1996.
Ziv Bar-Yossef et al., "Counting distinct elements in a data stream," *RANDOM '02 Proceedings of the 6th International Workshop on Randomization and Approximation Techniques*, pp. 1-10, 2002.
Ziv Bar-Yossef et al., "Reductions in Streaming Algorithms, with an Application to Counting Triangles in Graphs," *Proceedings of the 13th Annual ACM-SIAM Symposium on Discrete Algorithms*, pp. 623-632, 2002.
Kevin Beyer et al., "On Synopses for Distinct-Value Estimation Under Multiset Operations," *Proceedings of the 2007 ACM SIGMOD international conference on Management of data*, pp. 199-210, Jun. 12, 2007.
J. Lawrence Carter et al., "Universal Classes of Hash Functions," *STOC '77 Proceedings of the ninth annual ACM symposium on Theory of computing*, pp. 106-112, 1977.
Edith Cohen, "Size-Estimation Framework with Applications to Transitive Closure and Reachability," *Journal of Computer and System Sciences*, vol. 55 Issue 3, Dec. 1997.
Philippe Flajolet, "Probabilistic Counting Algorithms for Data Base Applications," *Journal of Computer and System Sciences*, vol. 31(2), pp. 182-209, Oct. 1985.
Phillip B. Gibbons, "Estimating Simple Functions on the Union of Data Streams," *Proceedings of the thirteenth annual ACM symposium on Parallel algorithms and architectures*, pp. 281-290, 2001.
Haas et al., "Fixed-Precision Estimation of Join Selectivity," *Proceedings of the twelfth ACM SIGACT-SIGMOD-SIGARD symposium on Principles of database systems*, pp. 190-201, 1993.
Kyu-Young Whang et al., "A Linear-Time Probabilistic Counting Algorithm for Database Applications," *Journal of ACM Transactions on Database Systems*, vol. 15(2), pp. 208-229, Jun. 1990.

* cited by examiner

*Primary Examiner* — Mahmoudi Tony
*Assistant Examiner* — Dennis Truong
(74) *Attorney, Agent, or Firm* — Fish & Richardson P.C.

(57) ABSTRACT

The subject matter of this specification can be embodied in, among other things, a computer-implemented method for counting one or more unique search results within a plurality of search results includes creating hash values for information in each of the search results using a first hash function. The first hash function has a predetermined hash value range size. The method further includes identifying a predetermined number of smallest hash values within the created hash values. The method further includes estimating a first number of unique search results based on the predetermined hash value range size, the predetermined number, and a largest hash value in the smallest hash values.

36 Claims, 5 Drawing Sheets

COUNTING UNIQUE SEARCH RESULTS

TECHNICAL FIELD

This instant specification relates to counting unique Internet search results.

BACKGROUND

Due to the large scale of data that Internet search engines process, it can be difficult to summarize all of the search results for a particular user's query. One example where search engines can have difficulty is in estimating the number of search results for a query. This can be affected by multiple factors, such as conserving time spent counting the search results by only processing a portion of the search results or filtering the search results before they are counted. For example, duplicate or nearly duplicate search results can be filtered out. Duplicate search results can skew the estimation of the number of search results.

Summarizing search results can occur, for example, when the search engines employ "faceted search." In the case of faceted search, the search engine presents to the user, alongside the search results, histograms summarizing the search results by different "facets." For example, product search engines frequently show histograms of the results by price, by brand, or by type. A histogram can include several "buckets" and the histogram presents the number of results that fall into each bucket. For example, in a price histogram, the buckets can correspond to price ranges (e.g., Up to $100, $100-$200, and $200-$300). Each price is labeled by the number of products that match the user's query and whose price falls within that price range bucket.

SUMMARY

In general, this document describes counting unique Internet search results. In a first aspect, a computer-implemented method for counting one or more unique search results within a plurality of search results includes creating hash values for information in each of the search results using a first hash function. The first hash function has a predetermined hash value range size. The method further includes identifying a predetermined number of smallest hash values within the created hash values. The method further includes estimating a first number of unique search results based on the predetermined hash value range size, the predetermined number, and a largest hash value in the smallest hash values.

Implementations can include any, all, or none of the following features. Estimating can include multiplying the predetermined hash value range size by the predetermined number and dividing by the largest hash value. The method can include presenting the first number of unique search results to a user. The information in the search results can include web page addresses. The information in the search results can include web page content. The information in the search results can include web page advertisements. The search results can include multiple facets, the facets can have associated corresponding histograms, the histograms can include corresponding one or more buckets, and the steps of creating, identifying, and estimating are performed for each of the buckets in each of the histograms associated with the facets.

The steps of creating, identifying, and estimating can be performed using at least a second hash function to estimate at least a second number of unique search results. The method can include averaging the first estimated number of unique search results and at least the second estimated number of unique search results to determine an average number of unique search results. Averaging can include determining a median of the first estimated number of unique search results and at least the second estimated number of unique search results. Estimating the first number of unique search results and estimating at least the second number of unique search results can be performed substantially in parallel.

Creating the hash values and identifying the predetermined number of smallest hash values can be performed separately by multiple computer devices using portions of the search results. The method can include merging the separately identified smallest hash values and identifying the predetermined number of smallest hash values within the merged smallest hash values. The multiple computer devices can perform creating the hash values and identifying the predetermined number of smallest hash values substantially in parallel.

In a second aspect, a computer program product, encoded on a computer-readable medium, is operable to cause one or more processors to perform operations for counting one or more unique search results within a plurality of search results. The operations include the operations described with respect to the first aspect. The operations can further include the implementations described with respect to the first aspect.

In a third aspect, a system includes a display device. The system further includes a machine-readable storage device including a program product. The system further includes one or more processors operable to execute the program product, interact with the display device, and perform operations for counting one or more unique search results within a plurality of search results. The operations include the operations described with respect to the first aspect. The operations can further include the implementations described with respect to the first aspect.

The systems and techniques described here may provide one or more of the following advantages. First, a system can provide an estimation of a number of unique search results. Second, a system can provide an estimation of a number of unique search results having particular guarantees on the estimation error and estimation confidence. Third, a system can provide an estimation of a number of unique search results in a large corpus by distributing processing over multiple computer devices. Fourth, a system can provide multiple estimations of numbers of unique search results for faceted search.

The details of one or more implementations of the counting unique search results feature are set forth in the accompanying drawings and the description below. Other features and advantages of the counting unique search results feature will be apparent from the description and drawings, and from the claims.

DESCRIPTION OF DRAWINGS

Like reference symbols in the various drawings indicate like elements.

DETAILED DESCRIPTION

This document describes systems and techniques for counting unique Internet search results.

Figure 1:
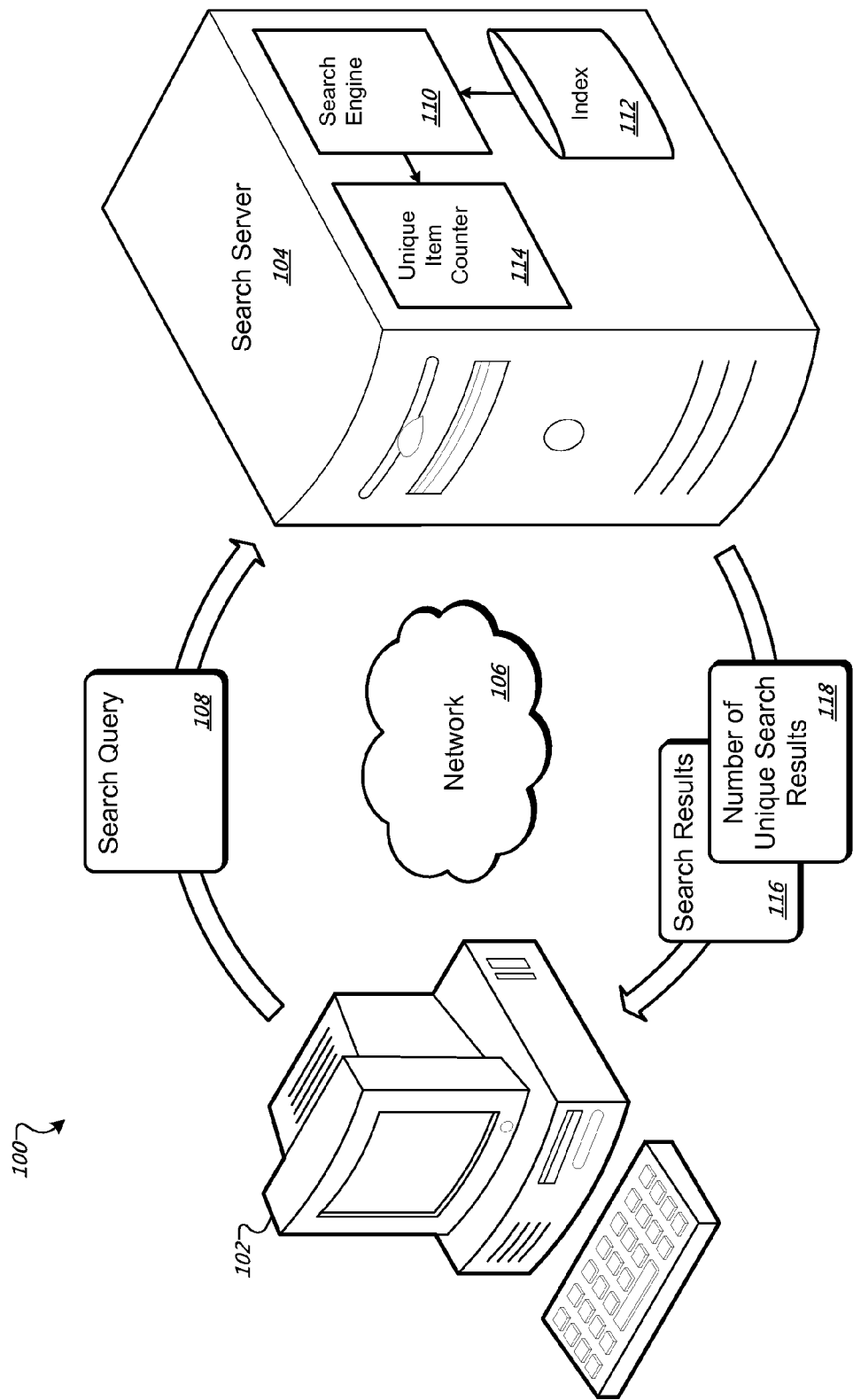
FIG. 1 is a schematic diagram showing an example of a system for counting unique search results.

FIG. 1 is a schematic diagram showing an example of a system 100 for counting unique search results. The system 100 includes a client device 102 and a search server 104 in communication over a network 106, such as the Internet. The client device 102 can include a user interface, such as a web browser application, that allows a user to input a search query 108. The client device 102 sends the search query 108 to the search server 104 over the network 106. Alternatively, the search query 108 can be initiated programmatically by an application at the client device 102 and/or the search server 104.

The search server 104 receives and processes the search query 108. The search server 104 includes a search engine 110, an index 112, and a unique item counter 114.

The search server 104 passes the search query 108 to the search engine 110 for processing. In some implementations, the search server 104 includes a request processor that interprets requests sent to the search server 104, such as the search query 108. The request processor associates requests with predefined acceptable requests and passes the requests on in the form of commands to other components, such as the search engine 110.

The search engine 110 performs the search query 108 and determines one or more search results 116. The search engine 110 can perform the search query 108 using the index 112 instead of searching the web sites themselves each time a request is made, so as to make the searching much more efficient.

The index 112 includes indexed web information, such as web pages and web page advertisements. The index 112 can be populated using information collected and formatted by a web crawler, which may continuously scan potential information sources for changing information. The index 112 allows the search engine 110 to quickly perform search queries on the indexed web information.

The search engine 110 passes the search results 116 to the unique item counter 114. The unique item counter 114 estimates a number of unique search results 118 in the search results 116.

To estimate the number of unique search results 118, the unique item counter 114 uses a hash function to create hash values of information in each of the search results 116. In some implementations, the hash function maps the information in each of the search results 116 to a random number. The information can include a network address or a portion of a network address, such as a uniform resource identifier, a domain name, or an Internet Protocol (IP) address. The information can include a web page or a portion of a web page, such as HyperText Markup Language (HTML) code from a head tag, a meta tag, or a body tag. The information can include a web page advertisement or a portion of a web page advertisement, such as HTML code in the advertisement or meta data associated with the advertisement (e.g., advertisement keywords, an advertiser name, or a product/service name).

The hash function maps the information in a search result to a random number in a particular range, such as the range from zero to some maximum range. The maximum range can be, for example, the maximum value represented by thirty-two, sixty-four, or one hundred twenty-eight binary bits of memory (e.g., "$2^{64}-1$" for sixty-four bits of memory). This range of hash values has a predetermined hash value range size (e.g., a range size of "$2^{64}$" for a range from zero to "$2^{64}-1$"). In some implementations, the number of bits of memory used for each hash value, and correspondingly the hash value range size, can be determined using the base two logarithm of an expected number of unique search results. In some implementations, the hash value range size can be chosen as the square of the expected number of unique search results. The amount of memory used by the unique item counter 114 can be varied by adjusting the number of bits used for each hash value. Correspondingly, the hash value range size of a hash value where the expected number of unique search results is less than or equal to about four billion is given by Equation 1.

$$\text{Hash Value Range Size} = (\text{Expected Number of Unique Items})^2 = (2^{32})^2 = 2^{64} \quad \text{Equation 1}$$

In some implementations, the hashing can be performed by another component, such as the search engine 110. In some implementations, hash values of information in search results can be stored, such as in the index 112, prior to a request to count the unique search results or perform a search. For example, the web crawler can create hash values of the information in the search results when generating the index 112.

The unique item counter 114 identifies a predetermined number of smallest hash values within the created hash values. These smallest hash values represent a sampling of the actual number of unique search results in the search results 116. In some implementations, the unique item counter 114 stores a list of these smallest hash values. The unique item counter 114 checks each hash value against the list. If the hash value being checked is not already in list; and the list has less than the predetermined number or the hash value being checked is smaller than the largest hash value in the list, then the hash value being checked is added to the list. This can be performed using operations as shown in Pseudo-Code 1.

```
For Each SearchResult in SearchResults
    HashValue=HashFunction(SearchResult)
    If HashValue Not in SmallestHashValues Then
        If   NumberOf(SmallestHashValues)<Predetermined-
             Number Then Insert HashValue in SmallestHashVal-
             ues
        Else If   HashValue<LargestOf(SmallestHashValues)
             Then Remove LargestOf(SmallestHashValues) from
             SmallestHashValues Insert HashValue in Smallest-
             HashValues
        End If
    End If
End For
```

Pseudo-Code 1

The unique item counter 114 uses the identified predetermined number of smallest hash values to estimate the number of unique search results 118. Specifically, where at least the predetermined number of unique search results have been identified, the unique item counter 114 multiplies the hash value range size by the predetermined number, divides by the largest of the smallest hash values, and subtracts one from the result. This can be performed using operations as shown in Pseudo-Code 2. In some implementations, the hash value range size and/or the predetermined number are cast to integers before calculating the estimated number of unique search results. In some implementations, the estimated number of unique search results is cast to an integer. In some implementations, a number (e.g., the estimated number of unique search results, the predetermined number, and the hash value range size) can be cast to an integer by rounding down, rounding up, or by rounding to the nearest integer.

If NumberOf(SmallestHashValues)<PredeterminedNumber
   Then
     EstimatedNumberOfUniqueSearchResults=NumberOf
      (SmallestHashValues)
Else
     EstimatedNumberOfUniqueSearchResults=
      (HashvalueRangesize*PredeterminedNumber/Larg-
      estof(smallestHashvalues))−1
End If Pseudo-Code 2

The search server 104 outputs the search results 116, or a portion of the search results 116, and the number of unique search results 118 to the client device 102. The client device 102 presents the search results 116 and the number of unique search results 118 to the user.

In some implementations, the search server 104 and/or the search query 108 identify or indicate that the search has multiple facets. For example, the search query 108 may be a product search. The product search may have a predefined search facet of price range or the search query 108 may specify facets. The search server 104 can perform the unique search results counting operations multiple times (e.g., once for each of the multiple price range buckets of the facet). For example, the search server 104 can identify a set of smallest hash values for each set of search results satisfying each of buckets in the price range facet. The price range buckets can include, for example, "Up to $100," "$100-$200," and "$200-$300." Further, additional unique search result operations can be performed for buckets of another facet, such as manufacturer model types or seller reputation levels.

The search server 104 sends the estimated numbers of unique search results for each of the multiple price ranges to the client device 102. The client device 102 presents the estimated numbers of unique search results to a user. For example, the client device 102 can present the estimated numbers of unique search results for the buckets of each facet to a user as a histogram. A histogram can be a graphical or text representation of the estimated numbers of unique search results for the buckets of a facet. For example, the histogram can present estimated numbers of unique search results indicating ten, nine, and zero unique search results for the price range buckets of "Up to $100," "$100-$200," and "$200-$300," respectively.

The predetermined number of smallest hash values can be chosen to achieve a particular error in the estimation of the number of unique search results 118. Here, error refers to the acceptable range or how close the estimation of the number of unique search results 118 is to the actual number. The error can be defined using the equation shown in Equation 2. A given error can be, for example, about one percent, five percent, or ten percent. This indicates that the estimated number of unique search results will be within one percent or ten percent, respectively, of the actual number of unique search results.

$$\frac{|\text{Actual Number of Unique Results} - \text{Estimated Number of Unique Results}|}{\text{Actual Number of Unique Results}} < \text{Error} \quad \text{Equation 2}$$

For a given error, the predetermined number can be calculated using the equation shown in Equation 3. For example, an error of ten percent results in a predetermined number equal to one hundred. In some implementations, the predetermined number can be multiplied by a constant coefficient such that the resulting predetermined number is proportional to the value given by Equation 3.

$$\text{Predetermined Number} = \left\lceil \frac{1}{\text{Error}^2} \right\rceil \quad \text{Equation 3}$$

Figure 2:
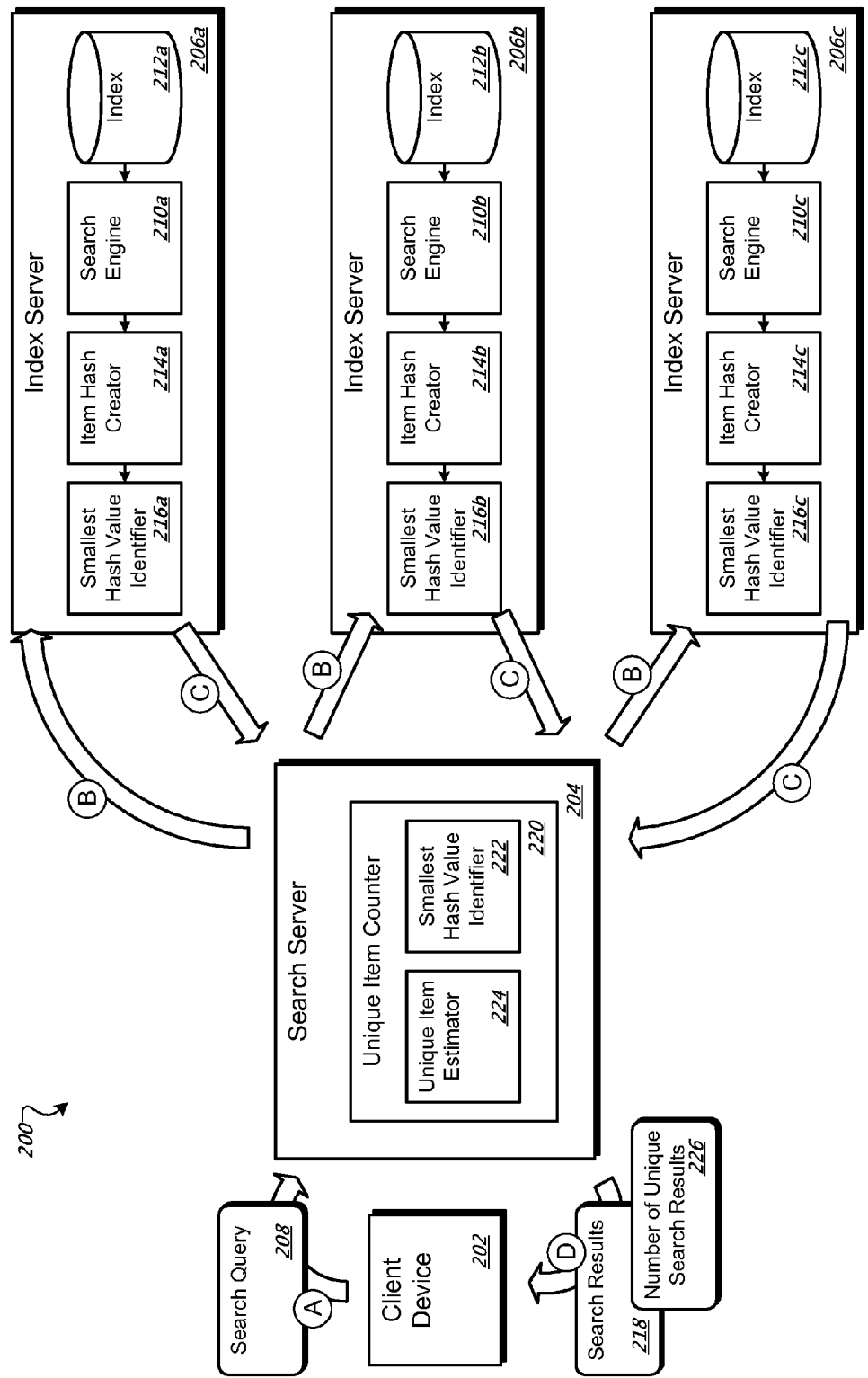
FIG. 2 is a block diagram showing an example of a distributed system for counting unique search results.

FIG. 2 is a block diagram showing an example of a distributed system 200 for counting unique search results. The distributed system 200 includes a client device 202, a search server 204, and multiple index servers 206a-c. Again, a user can input a search query 208 at the client device 202. The client device 202 sends (step A) the search query 208 to the search server 204. The search server 204 passes (steps B) the search query 208 to each of the index servers 206a-c. In some implementations, passing the search query 208 to the index servers 206a-c is performed substantially in parallel.

The index servers 206a-c include multiple search engines 210a-c, respectively, for processing the search query 208. The index servers 206a-c also include multiple indexes 212a-c that store indexed web content in which the search engines 210a-c perform the search query 208. In some implementations, web page content, web page advertisement content, or other Internet content is distributed among the indexes 212a-c. In some implementations, distributing the content among the indexes 212a-c divides the work of searching through the content and provides for handling of large amounts of content. Each of the search engines 210a-c determine respective search results from performing the search query 208 on the indexes 212a-c, respectively.

The search engines 210a-c pass the respective search results to multiple item hash creators 214a-c. The item hash creators 214a-c create hash values for the information in the respective search results.

The item hash creators 214a-c pass the respective hash values to multiple smallest hash value identifiers 216a-c. The smallest hash value identifiers 216a-c can perform operations, such as those shown in Pseudo-Code 1, to identify a predetermined number of smallest hash values within the respective hash values. The smallest hash value identifiers 216a-c send (steps C) the respective sets of identified smallest hash values to the search server 204. In some implementations, the index servers 206a-c also send the respective search results to the search server 204. In some implementations, any and/or all of the processing performed by the index servers 206a-c (e.g., searching, creating, identifying, and sending) can be performed substantially in parallel.

The search server 204 merges the respective search results as search results 218. The search server 204 also merges the respective smallest hash values. The search server 204 includes a unique item counter 220 for counting the unique search results in the merged smallest hash values determined using the search results from the indexes 212a-c.

The unique item counter 220 includes a smallest hash value identifier 222 and a unique item estimator 224. The smallest hash value identifier 222 can perform operations, such as those shown in Pseudo-Code 1, to again identify the predetermined number of smallest hash values within the merged hash values. The unique item estimator 224 can perform operations, such as those shown in Pseudo-Code 2, to estimate a number of unique search results 226 in the search results 218.

The search server 204 sends (step D) the search results 218 and the number of unique search results 226 to the client device 202. The client device 202 presents the search results 218 and the number of unique search results 226 to the user.

While shown here as a single parent and child relationship, the distributed system 200 can be a hierarchy or tree of index servers and search servers having many levels. For example, a search server can merge sets of smallest hash values from child index servers and send the merged results to another search server. In some implementations, the distributed system 200 can be an acyclic directed graph. In some implementations, a server may perform roles of the index and search servers, such as by performing searching and merging operations.

Figure 3:
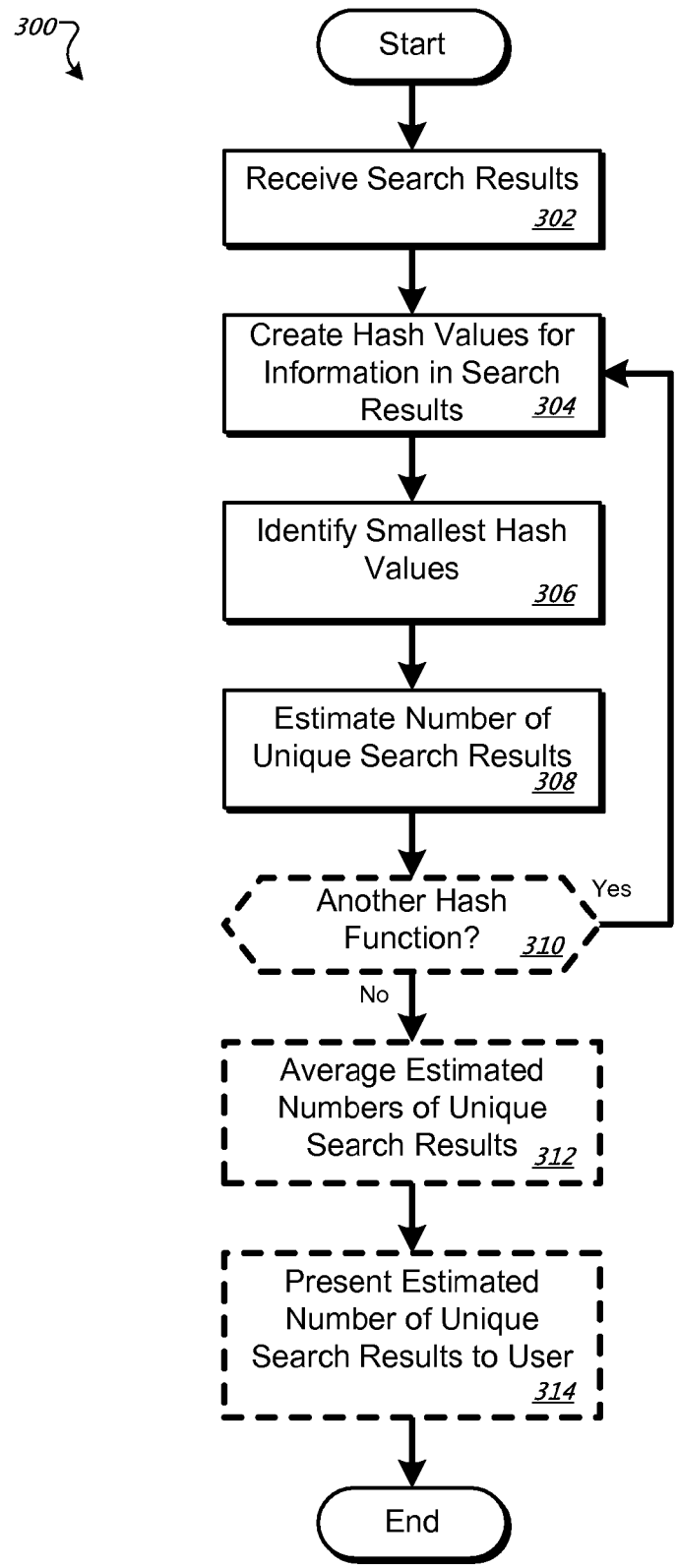
FIG. 3 is a flow chart showing an example of a process for counting unique search results.

FIG. 3 is a flow chart showing an example of a process 300 for counting unique search results. The process 300 may be performed, for example, by a system such as the system 100 and the distributed system 200. For clarity of presentation, the description that follows uses the system 100 and the distributed system 200 as the basis of an example for describing the process 300. However, another system, or combination of systems, may be used to perform the process 300.

The process 300 begins with receiving (302) search results. For example, the unique item counter 114 can receive the search results 116 from the search engine 110.

The process 300 creates (304) a hash value for information in each of the received search results. For example, the unique item counter 114 can create a random or pseudo-random hash value for the information that maps the information to a hash value in a range having a particular hash value range size, as shown in Equation 1.

The process 300 identifies (306) a predetermined number of smallest hash values in the created hash values. For example, the unique item counter 114 can identify the smallest hash values using the algorithm shown in Pseudo-Code 1 and a predetermined number as shown in Equation 3.

The process 300 estimates (308) a number of unique search results using the hash value range size, the predetermined number, and a largest hash value in the identified smallest hash values. For example, the unique item counter 114 can estimate the number of unique search results 118 using the algorithm shown in Pseudo-Code 2.

Optionally, if another hash function is used (310), then the process 300 creates (304) hash values, identifies (306) smallest hash values, and estimates (308) another number of unique search results using the subsequent hash function. While shown as a sequential loop in FIG. 3, the hash functions can be processed in parallel or substantially in parallel. Optionally, the process 300 averages (312) the estimated numbers of unique search results. In some implementations, the averaging includes calculating the median of the estimated numbers of unique search results. In some implementations, the averaging includes calculating an arithmetic mean of the estimated numbers of unique search results. Optionally, the process 300 presents (314) the average number of unique search results to a user.

In some implementations, the number of hash functions used can be determined based on a confidence value. Here, confidence refers to an acceptable frequency of errors in the estimation of the number of unique search results. The confidence can be defined in terms of the probability that the error is within the limits previously described using the equation shown in Equation 4. For example, a given confidence value may be an error frequency of about one error in one million counts or one error in one billion counts.

$$\text{Probability}\left(\frac{|\text{Actual Unique Results} - \text{Estimated Unique Results}|}{\text{Actual Unique Results}} < \text{Error}\right) \geq 1 - \text{Confidence} \quad \text{Equation 4}$$

The confidence can be calculated using the equation shown in Equation 5. For example, a confidence of one in one billion results in a number of hash functions equal to twenty-one. In some implementations, the base of the logarithm can be a base other than the natural base, such as base 2. In some implementations, the number of hash functions can be multiplied by a constant coefficient such that the resulting number of hash functions is proportional to the value given by Equation 5.

$$\text{Number Of Hash Functions} = \left\lceil \ln\left(\frac{1}{\text{Confidence}}\right) \right\rceil \quad \text{Equation 5}$$

Figure 4:
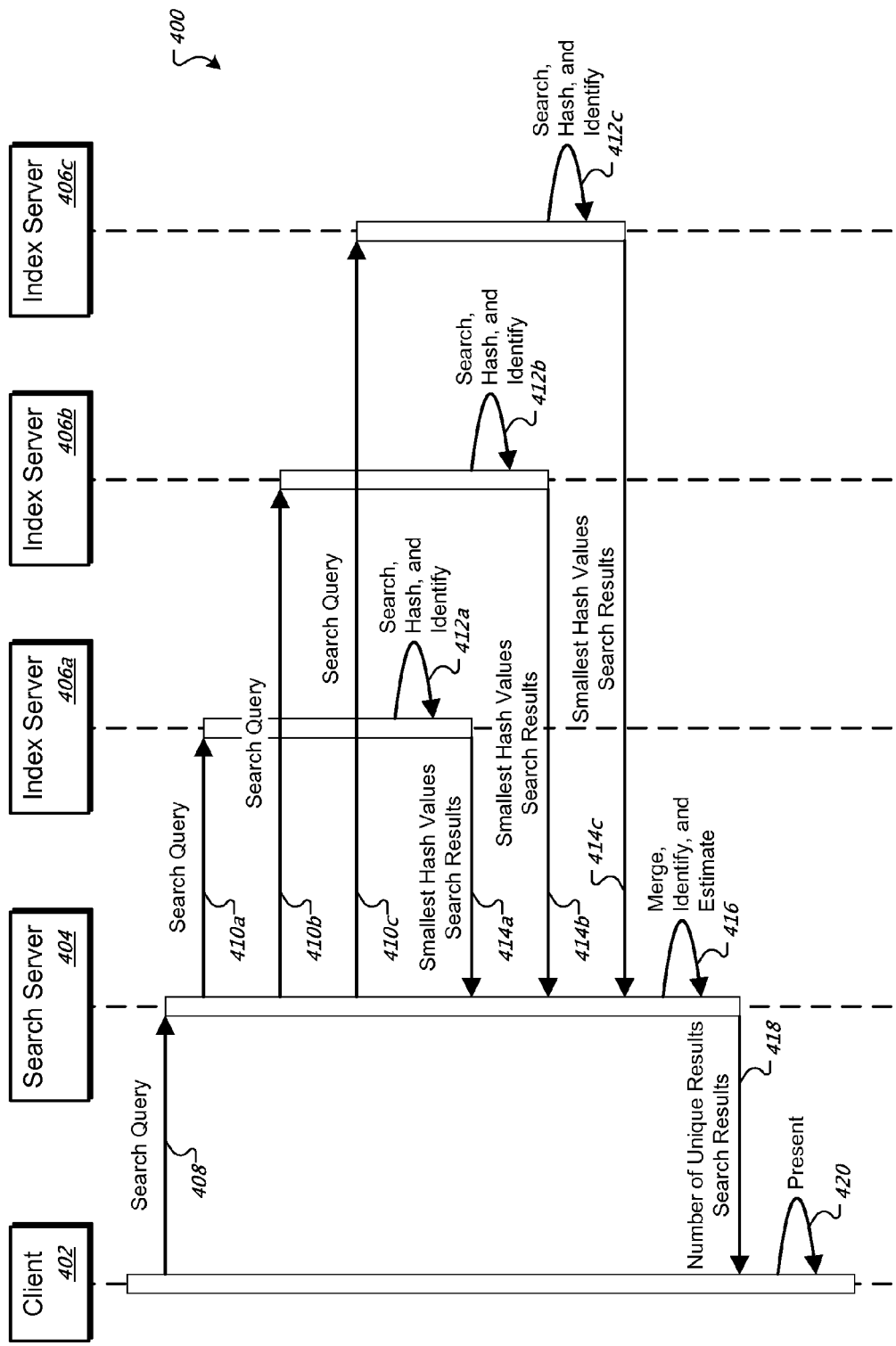
FIG. 4 is a sequence diagram showing an example of a distributed process for counting unique search results.

FIG. 4 is a sequence diagram showing an example of a distributed process 400 for counting unique search results. The distributed process 400 may be performed, for example, by a system such as the system 100 and the distributed system 200. For clarity of presentation, the description that follows uses the system 100 and the distributed system 200 as the basis of an example for describing the distributed process 400. However, another system, or combination of systems, may be used to perform the distributed process 400.

The distributed process 400 shows interactions between a client device 402, a search server 404, and multiple index servers 406a-c. The client device 402 sends (408) a search query to the search server 404. The search server 404 sends (410a-c) the search query to the index servers 406a-c.

The index servers 406a-c each perform (412a-c) a search using the search query, create hash values for information in the search results of the search query, and identify a predetermined number of smallest hash values in the created hash values. The index servers 406a-c each send (414a-c) the smallest hash values and the search results to the search server 404.

The search server 404 merges (416) the respective smallest hash values and search results, identifies the predetermined number of smallest hash values in the merged hash values, and uses the identified smallest hash values to estimate the number of unique search results. The search server 404 sends (418) the estimated number of unique search results and the search results to the client device 402, where the client device 402 presents (420) the number of unique search results and the search results to the user.

In some implementations, an amount of memory used by the unique search results counting may be calculated using the equation shown in Equation 6. In some implementations, the amount of memory used can be multiplied by a constant coefficient such that the resulting amount of memory used is proportional to the value given by Equation 6. In some implementations, this is also the amount of hash value data sent from an index server to a search server for merging with other hash values.

For example, given a confidence of one in one billion, an error of ten percent, and a sixty-four bit hash value range size, the amount of memory used by a index single server while identifying smallest hash values is equal to 16.8 kilobytes. To reduce the amount of memory used, tradeoffs can be made. For example, the confidence can be reduced at the expense of more frequent errors. The error can be reduced at the expense of a greater range of error values. The hash value range size can be reduced, but may cause errors if the expected number of unique search results is larger than the square root of the hash value range size.

Amount of Memory Used = Equation 6

$$\left\lceil \ln\left(\frac{1}{\text{Confidence}}\right) \right\rceil \times \left\lceil \frac{1}{\text{Error}^2} \right\rceil \times \log_2(\text{Hash Value Range Size})$$

Figure 5:
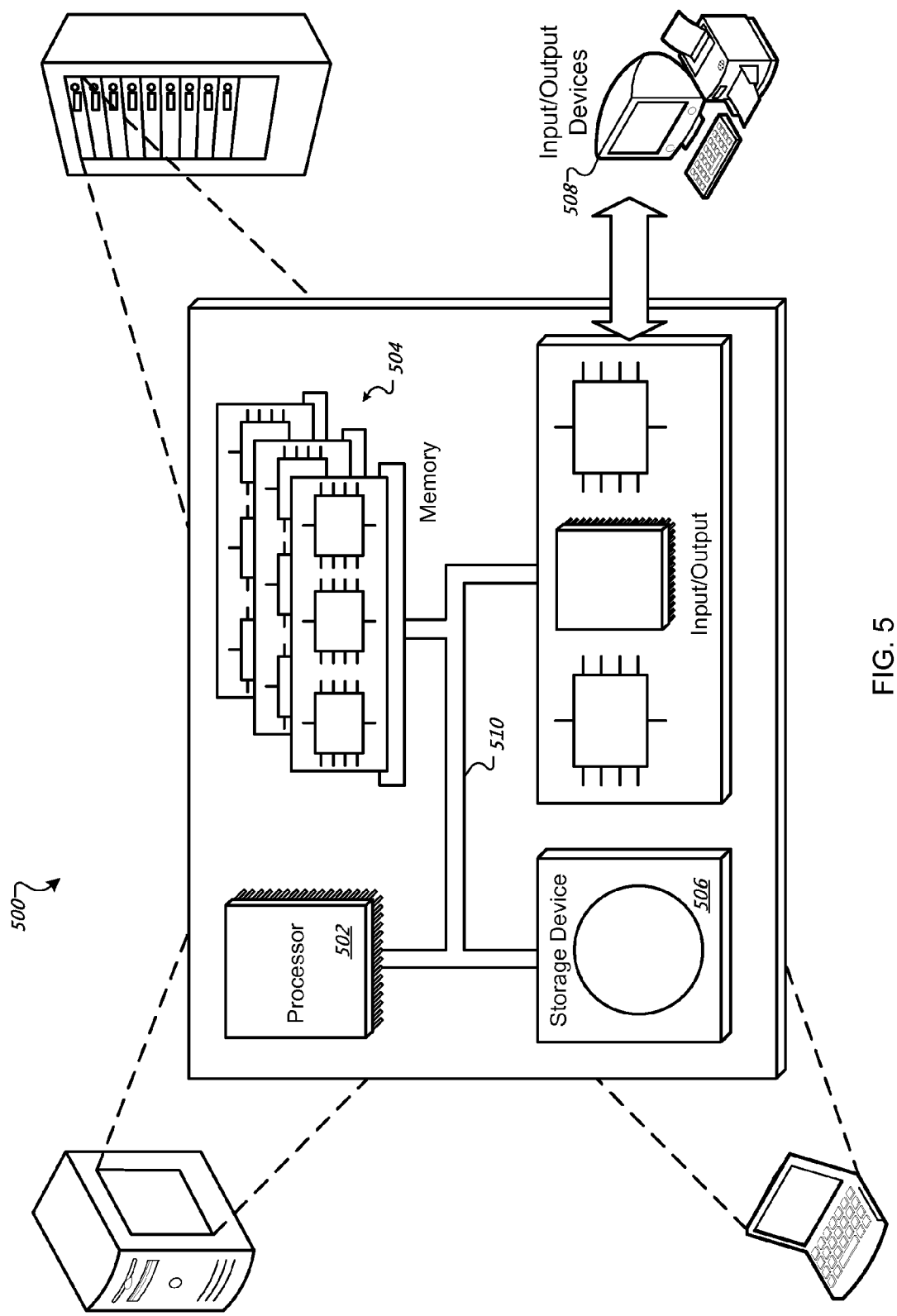
FIG. 5 is a schematic diagram showing an example of a generic computing system that can be used in connection with computer-implemented methods described in this document.

FIG. 5 is a schematic diagram of a generic computing system 500. The generic computing system 500 can be used for the operations described in association with any of the computer-implemented methods described previously, according to one implementation. The generic computing system 500 includes a processor 502, a memory 504, a storage device 506, and an input/output device 508. Each of the processor 502, the memory 504, the storage device 506, and the input/output device 508 are interconnected using a system bus 510. The processor 502 is capable of processing instructions for execution within the generic computing system 500. In one implementation, the processor 502 is a single-threaded processor. In another implementation, the processor 502 is a multi-threaded processor. The processor 502 is capable of processing instructions stored in the memory 504 or on the storage device 506 to display graphical information for a user interface on the input/output device 508.

The memory 504 stores information within the generic computing system 500. In one implementation, the memory 504 is a computer-readable medium. In one implementation, the memory 504 is a volatile memory unit. In another implementation, the memory 504 is a non-volatile memory unit.

The storage device 506 is capable of providing mass storage for the generic computing system 500. In one implementation, the storage device 506 is a computer-readable medium. In various different implementations, the storage device 506 may be a floppy disk device, a hard disk device, an optical disk device, or a tape device.

The input/output device 508 provides input/output operations for the generic computing system 500. In one implementation, the input/output device 508 includes a keyboard and/or pointing device. In another implementation, the input/output device 508 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems.

Accordingly, other implementations are within the scope of the following claims.

What is claimed is:

1. A computer-implemented method for counting one or more unique search results within a plurality of search results, comprising:

creating hash values for the one or more unique search results using a first hash function, wherein the first hash function has a hash value range size, and wherein a hash value comprises information indicative of a uniqueness of a search result within the plurality of search results, with each of the one or more unique search results comprising a search result that differs from each of the other search results;

retrieving information indicative of a number of smallest hash values to be selected from the hash values, with the number of smallest hash values in accordance with a margin of error for a first estimated number of unique search results within the plurality of search results;

identifying, from the hash values, the number of smallest hash values;

generating the first estimated number of unique search results at least partly based on (i) the hash value range size, (ii) the number of smallest hash values, and (iii) a largest hash value in the smallest hash values;

generating, using a second hash function, a second estimated number of unique search results; and determining, based on the first estimated number of unique search results and the second estimated number of unique search results, an average number of unique search results.

2. The method of claim 1, wherein generating the first estimated number comprises multiplying the hash value range size by the number of smallest hash values and dividing by the largest hash value.

3. The method of claim 1, further comprising providing the first estimated number of unique search results to a user.

4. The method of claim 1, wherein the plurality of search results comprises web page address information.

5. The method of claim 1, wherein the plurality of search results comprises web page content.

6. The method of claim 1, wherein the plurality of search results comprises web page advertisements.

7. The method of claim 1, wherein the plurality of search results comprises multiple facets, with a facet associated with one or more buckets, and wherein the method further comprises:

generating a histogram, with the histogram comprising a visual representation of the one or more buckets for the facet; and performing the operations of creating, identifying, and generating the first estimated number for each of the one or more buckets in the histogram associated with the facet.

8. The method of claim 1, wherein the average number of unique search results is at least partly based on a median of the first estimated number of unique search results and the second estimated number of unique search results.

9. The method of claim 1, wherein generating the first number of unique search results and generating the second number of unique search results are performed substantially in parallel.

10. The method of claim 1, wherein creating the hash values and identifying the number of smallest hash values are performed separately by multiple computer devices using portions of the search results.

11. The method of claim 10, further comprising merging separately identified smallest hash values and identifying the number of smallest hash values within a set of merged smallest hash values.

12. The method of claim 10, wherein the multiple computer devices are configured to perform creating the hash values and identifying the number of smallest hash values substantially in parallel.

13. One or more non-transitory computer-readable media that store instructions that are executable by, one or more processors to perform operations for counting one or more unique search results within a plurality of search results, the operations comprising:

creating hash values for the one or more unique search results using a first hash function, wherein the first hash function has a hash value range size, and wherein a hash value comprises information indicative of a uniqueness of a search result within the plurality of search results, with each of the one or more unique search results comprising a search result that differs from each of the other search results;

retrieving information indicative of a number of smallest hash values to be selected from the hash values, with the number of smallest hash values in accordance with a margin of error for a first estimated number of unique search results within the plurality of search results;

identifying, from the hash values, the number of smallest hash values;

generating the first estimated number of unique search results at least partly based on (i) the hash value range size, (ii) the number of smallest hash values, and (iii) a largest hash value in the smallest hash values;

generating, using a second hash function, a second estimated number of unique search results; and determining, based on the first estimated number of unique search results and the second estimated number of unique search results, an average number of unique search results.

14. The one or more computer-readable media of claim 13, wherein generating the first estimated number comprises multiplying the hash value range size by the number of smallest hash values and dividing by the largest hash value.

15. The one or more non-transitory computer-readable media of claim 13, wherein the operations further comprise:

providing the first estimated number of unique search results to a user.

16. The one or more non-transitory computer-readable media of claim 13, wherein the plurality of search results comprises web page address information.

17. The one or more non-transitory computer-readable media of claim 13, wherein the plurality of search results comprises web page content.

18. The one or more non-transitory computer-readable media of claim 13, wherein the plurality of search results comprises web page advertisements.

19. The one or more non-transitory computer-readable media of claim 13, wherein the plurality of search results comprises multiple facets and the actions of creating, identifying, and generating the first estimated number are performed for each of the multiple facets.

20. The one or more non-transitory computer-readable media of claim 13, wherein the average number of unique search results is at least partly based on a median of the first estimated number of unique search results and the second estimated number of unique search results.

21. The one or more non-transitory computer-readable media of claim 13, wherein generating the first number of unique search results and generating the second number of unique search results are performed substantially in parallel.

22. The one or more non-transitory computer-readable media of claim 13, wherein creating the hash values and identifying the number of smallest hash values are performed separately by multiple computer devices using portions of the search results.

23. The one or more non-transitory computer-readable media of claim 22, wherein the operations further comprise:
merging separately identified smallest hash values and identifying the number of smallest hash values within a set of merged smallest hash values.

24. The one or more non-transitory computer-readable media of claim 22, wherein the multiple computer devices are configured to perform creating the hash values and identifying the number of smallest hash values substantially in parallel.

25. A system comprising:
one or more processors; and
one or more non-transitory computer-readable media that store instructions that are executable by the one or more processors to perform operations for counting one or more unique search results within a plurality of search results, the operations comprising:
creating hash values for the one or more unique search results using a first hash function, wherein the first hash function has a hash value range size, and wherein a hash value comprises information indicative of a uniqueness of a search result within the plurality of search results, with each of the one or more unique search results comprising a search result that differs from each of the other search results;
retrieving information indicative of a number of smallest hash values to be selected from the hash values, with the number of smallest hash values in accordance with a margin of error for a first estimated number of unique search results within the plurality of search results;
identifying, from the hash values, the number of smallest hash values;
generating the first estimated number of unique search results at least partly based on (i) the hash value range size, (ii) the number of smallest hash values, and (iii) a largest hash value in the smallest hash values;
generating, using a second hash function, a second estimated number of unique search results; and
determining, based on the first estimated number of unique search results and the second estimated number of unique search results, an average number of unique search results.

26. The system of claim 25, wherein generating the first estimated number comprises multiplying the hash value range size by the number of smallest hash values and dividing by the largest hash value.

27. The system of claim 25, further comprising providing the first estimated number of unique search results to a user.

28. The system of claim 25, wherein the plurality of search results comprises web page address information.

29. The system of claim 25, wherein the plurality of search results comprises web page content.

30. The system of claim 25, wherein the plurality of search results comprises web page advertisements.

31. The system of claim 25, wherein the plurality of search results comprises multiple facets and the actions of creating, identifying, and generating the first estimated number are performed for each of the multiple facets.

32. The system of claim 25, wherein the average number of unique search results is at least partly based on a median of the first estimated number of unique search results and the second estimated number of unique search results.

33. The system of claim 25, wherein generating the first number of unique search results and generating the second number of unique search results are performed substantially in parallel.

34. The system of claim 25, wherein creating the hash values and identifying the number of smallest hash values are performed separately by multiple computer devices using portions of the search results.

35. The system of claim 34, wherein the operations further comprise:
merging separately identified smallest hash values and identifying the number of smallest hash values within a set of merged smallest hash values.

36. The system of claim 34, wherein the multiple computer devices are configured to perform creating the hash values and identifying the number of smallest hash values substantially in parallel.

* * * * *

UNITED STATES PATENT AND TRADEMARK OFFICE
CERTIFICATE OF CORRECTION

PATENT NO. : 8,065,309 B1  
APPLICATION NO. : 12/106860  
DATED : November 22, 2011  
INVENTOR(S) : Ziv Bar-Yossef Page 1 of 1

It is certified that error appears in the above-identified patent and that said Letters Patent is hereby corrected as shown below:

First page, Column 2, Line 20 delete "SIGARD" and insert -- SIGART --

Column 12, Line 39 after "one or more" insert -- non-transitory --

Signed and Sealed this  
Twenty-fourth Day of January, 2012

David J. Kappos  
*Director of the United States Patent and Trademark Office*